(12) United States Patent
Oshima et al.

(10) Patent No.: US 8,859,633 B2
(45) Date of Patent: Oct. 14, 2014

(54) ADHERENT COMPOSITION AND METHOD OF TEMPORARILY FIXING MEMBER THEREWITH

(75) Inventors: Kazuhiro Oshima, Shibukawa (JP); Tomoyuki Kanai, Shibukawa (JP); Kunio Iriuchijima, Shibukawa (JP)

(73) Assignee: Denki Kagaku Kogyo Kabushiki Kaisha, Tokyo (JP)

(*) Notice: Subject to any disclaimer, the term of this patent is extended or adjusted under 35 U.S.C. 154(b) by 134 days.

(21) Appl. No.: 13/178,186

(22) Filed: Jul. 7, 2011

(65) Prior Publication Data

US 2011/0265934 A1  Nov. 3, 2011

Related U.S. Application Data

(63) Continuation of application No. 11/816,538, filed as application No. PCT/JP2005/010612 on Jun. 9, 2005, now Pat. No. 8,187,411.

(30) Foreign Application Priority Data

| Mar. 18, 2005 | (JP) | 2005-078298 |
| Apr. 7, 2005 | (JP) | 2005-110798 |
| Apr. 7, 2005 | (JP) | 2005-110799 |

(51) Int. Cl.

| C08F 2/46 | (2006.01) |
| B32B 38/10 | (2006.01) |
| B32B 37/12 | (2006.01) |
| B29C 65/14 | (2006.01) |
| C09D 4/06 | (2006.01) |
| C09J 133/14 | (2006.01) |
| C08G 18/67 | (2006.01) |
| C09J 175/16 | (2006.01) |

(52) U.S. Cl.
CPC .................. C09J 133/14 (2013.01); C09D 4/06 (2013.01); C08G 18/672 (2013.01); C09J 175/16 (2013.01)
USPC ............. 522/96; 522/113; 522/114; 522/116; 522/120; 522/150; 522/173; 522/174; 522/176; 522/178; 522/182; 156/86; 156/247

(58) Field of Classification Search
USPC ........... 522/96, 113, 114, 121, 122, 116, 150, 522/151, 152, 173, 174, 176, 178, 182
See application file for complete search history.

(56) References Cited

U.S. PATENT DOCUMENTS

| 4,271,258 A | 6/1981 | Watariguchi | |
| 4,691,045 A * | 9/1987 | Fukuchi et al. | 560/185 |
| 4,720,317 A | 1/1988 | Kuroda et al. | |
| 5,128,388 A | 7/1992 | Komori et al. | |
| 6,040,048 A | 3/2000 | Kato et al. | |
| 6,503,961 B1 * | 1/2003 | Okazaki et al. | 522/173 |
| 6,767,631 B2 * | 7/2004 | Ono et al. | 428/355 AC |

FOREIGN PATENT DOCUMENTS

| JP | 1-207371 A | 8/1989 |
| JP | 6 116534 | 4/1994 |
| JP | 6-116535 A | 4/1994 |
| JP | 6-184269 | 7/1994 |
| JP | 7-157531 | 6/1995 |
| JP | 7 330835 | 12/1995 |
| JP | 9-277313 | 10/1996 |
| JP | 9-295880 | 11/1997 |
| JP | 10 130309 | 5/1998 |
| JP | 10-245526 A | 9/1998 |
| JP | 10-251602 A | 9/1998 |
| JP | 10-265742 | 10/1998 |
| JP | 11-34243 | 2/1999 |
| JP | 11 71553 | 3/1999 |
| JP | 11-279242 | 10/1999 |
| JP | 2000 38547 | 2/2000 |
| JP | 2001 172336 | 6/2001 |
| JP | 2001 181355 | 7/2001 |
| JP | 2001 226641 | 8/2001 |
| JP | 2002-60442 | 2/2002 |
| JP | 2002-173516 | 6/2002 |
| JP | 2002 338900 | 11/2002 |
| JP | 2002-348534 | 12/2002 |
| JP | 2003-128714 A | 5/2003 |
| JP | 2003 155455 | 5/2003 |
| JP | 2004 143233 | 5/2004 |
| JP | 2004-182765 | 7/2004 |

OTHER PUBLICATIONS

Office Action issued on Aug. 30, 2011 in the corresponding Japanese Patent Application No. 2005-224101 (with English Translation).
Office Action issued on Aug. 30, 2011 in the corresponding Japanese Patent Application No. 2005-239987 (with English Translation).

(Continued)

*Primary Examiner* — Sanza McClendon
(74) *Attorney, Agent, or Firm* — Oblon, Spivak, McClelland, Maier & Neustadt, L.L.P.

(57) ABSTRACT

Provided are a temporal fixation method in processing of optical members and a resin composition suitable therefore, which uses a composition which is characterized by containing the following (A3), (B3) and (D3), wherein (A3) is a urethane(meth)acrylate; (B3) is one or more (meth)acrylic acid derivative monomers selected from the group consisting of n-(meth)acryloyloxyalkyl hexahydrophthalimides, carboxyl group-containing (meth)acrylates and (meth)acrylic acid derivative monomers represented by the formula (C3):

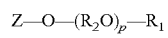

Formula (C3):

wherein Z represents a (meth)acryloyl group, $R_1$ represents a phenyl group or a phenyl group having an alkyl group with 1 to 3 carbon atoms, $R_2$ represents $-C_2H_4-$, $-C_3H_6-$, $-CH_2CH(CH_3)-$, $-CH_2CH(OH)CH_2-$, $-C_4H_8-$ or $-C_6H_{12}-$, and p represents an integer of from 1 to 10; and D(3) is a photopolymerization initiator, along with methods for temporarily fixing a member.

6 Claims, No Drawings

(56) References Cited

OTHER PUBLICATIONS

Japanese Office Action issued on Oct. 4, 2011 in corresponding Japanese Application No. 2005-194752 (with an English Translation).
Office Action issued May 10, 2011, in Japanese Patent Application No. 2005-194752 with English translation.
U.S. Appl. No. 13/181,031, filed Jul. 12, 2011, Kanai, et al.
U.S. Appl. No. 13/436,025, filed Mar. 30, 2012, Kanai, et al.
Japanese Office Action issued on Apr. 24, 2012 in corresponding Japanese Application No. 2006-005597 (with an English Translation).
Office Action issued Dec. 20, 2011, in Japanese Patent Application No. 2006-141023 (with English-language translation).

* cited by examiner

ADHERENT COMPOSITION AND METHOD OF TEMPORARILY FIXING MEMBER THEREWITH

CROSS REFERENCE TO RELATED APPLICATIONS

The present application is a Continuation of U.S. application Ser. No. 11/816,538, filed Aug. 17, 2007, pending, which is a 371 national stage application of PCT/JP05/010612, filed Jun. 9, 2005, the entire contents of each of which are hereby incorporated by reference. The present application also claims priority to Japanese applications 2005-078298, filed Mar. 18, 2005; 2005-110798, filed Apr. 7, 2005; and 2005-110799, filed Apr. 7, 2005, the entire contents of each of which are hereby incorporated by reference.

TECHNICAL FIELD

The present invention relates to a method for temporarily fixing a member in processing of various members, and an adhesive composition and an adhesive suitable for the fixation. More particularly, the present invention relates to a method for temporarily fixing an optical member in processing the member and a photocurable adhesive suitable for the application.

BACKGROUND ART

Two-sided tapes and hot-melt type adhesives are used as adhesives for temporary fixation method of optical lenses, prisms, arrays, silicon wafers, semiconductor packaging parts, and so on, and members bonded or laminated with use of these adhesives are cut into a predetermined shape, followed by removal of the adhesive to produce processed members. With respect to the semiconductor packaging parts, for example, they are fixed on a substrate with a two-sided tape and then cut into desired parts, and the two-sided tape is irradiated with ultraviolet rays to be separated from the parts. Furthermore, in the case of the hot-melt type adhesive, members are bonded therewith and heated to let the adhesive penetrate into their interspace, and then the members are cut into desired parts, followed by removal of the adhesive in an organic solvent.

However, in the case of the two-sided tape, there were problems that it was difficult to achieve satisfactory thickness accuracy; that it was inferior in the chipping property in processing of parts because of weak adhesive strength; that it was impossible to separate the tape without heating at 100° C. or more; and that, where it was separated by irradiation with ultraviolet rays, it was impossible to separate the tape if an adherend had a poor UV transmittance.

In the case of the hot-melt type adhesive, it could not be effective in bonding without heating at 100° C. or more, so that there was a restriction on the members to be used. Furthermore, it was necessary to use an organic solvent in removal of the adhesive, and washing steps with an alkali solvent and a halogen type organic solvent were cumbersome and also problematic from the viewpoint of working environments.

In order to overcome these drawbacks, there were proposals on photocurable or heat-curable adhesives for temporary fixation method containing a water-soluble compound such as a water-soluble vinyl monomer. These adhesive compositions solved the problem of the removability in water but they still had problems that the adhesive strength was low in fixation of parts and that the members after cut had poor dimensional accuracy. Furthermore, there were proposals on adhesives for temporary fixation method improved in adhesion with use of a specific, highly hydrophilic (meth)acrylate, and, also improved in removability by swelling and partial dissolution. However, a cutting process involves generation of frictional heat between the parts and a cutting jig such as a blade or a diamond cutter and thus is carried out while cooling the parts with a large amount of water. Therefore, a cured resin of the above highly hydrophilic composition swells to become soft during the cutting, whereby higher dimensional accuracy cannot be achieved. In addition, the cured resin dissolved in part remains as a residual adhesive on the members after the removal, which causes a problem in appearance (cf. Patent Documents 1, 2 and 3).

Patent Document 1: JP-A-06-116534
Patent Document 2: JP-A-11-71553
Patent Document 3: JP-A-2001-226641

DISCLOSURE OF THE INVENTION

Problem to be Solved by the Invention

In order to improve the dimensional accuracy of the members after cutting, there are desires for a photocurable adhesive hydrophobic, high in adhesive strength, excellent in removability in water, free of an adhesive residue on the members after removal, and environmentally excellent in working, particularly, in application fields of optical members.

The inventors of the present invention have conducted extensive studies to solve the above problems in the prior art, and as a result, have found that an adhesive composition having a high adhesive strength and a good removability in water or in warm water is obtained with use of specific hydrophobic (meth)acryl monomers in combination, and that the object of the present invention could be attained. The present invention has been accomplished on the basis of such a discovery.

Means for Solving the Problem

The present invention resides in the following gists.

1. A composition which is characterized by comprising (A1): a (meth)acrylate with a molecular weight of at least 500 having at least one (meth)acryloyl group at a terminal or in a side chain of a molecule, (B1): a polyfunctional (meth)acrylate, (C1): a (meth)acrylate other than the above-mentioned (A1) and (B1), and (D1): a photopolymerization initiator (the composition will hereinafter be referred to as "Embodiment I").
2. The composition according to the above-mentioned 1, wherein (A1) comprises at least one member selected from the group consisting of a polybutadiene, a polyisoprene and their hydrogenated products.
3. The composition according to the above-mentioned 1 or 2, wherein (A1), (B1) and (C1) are all hydrophobic.
4. The composition according to any one of the above-mentioned 1 to 3, comprising from 5 to 80 parts by mass of (A1), from 1 to 50 parts by mass of (B1), from 5 to 80 parts by mass of (C1) and from 0.1 to 20 parts by mass of (D1).
5. A composition comprising (A2): a (meth)acrylate with a molecular weight of at least 500 having at least one (meth)acryloyl group at a terminal or in a side chain of a molecule, (B2): a polyfunctional (meth)acrylate, (C2): a (meth)acrylate other than the above-mentioned (A2) and (B2), (D2): a photopolymerization initiator and (E2): a polar organic solvent (the composition will hereinafter be referred to as "Embodiment II").
6. The composition according to the above-mentioned 5, wherein (E2) is at least one member selected from the group consisting of methanol, ethanol, isopropyl alcohol and n-butanol.
7. The composition according to the above-mentioned 5 or 6, wherein (A2), (B2) and (C2) are all hydrophobic.
8. The composition according to any one of the above-mentioned 5 to 7, comprising from 1 to 50 parts by mass of (A2) and (B2), from 5 to 95 parts by mass of (C2), from 0.1 to 20 parts by mass of (D2) and from 0.5 to 10 parts by mass of (E2).
9. An adhesive comprising the composition as defined in any one of the above-mentioned 1 to 8.
10. A method for temporarily fixing a member, characterized by comprising bonding to temporarily fix the member with use of the composition as defined in any one of the above-mentioned 1 to 8, processing the temporarily fixed member, and immersing the processed member in warm water of at most 90° C., thereby removing a cured resin of the composition.
11. A composition comprising the following (A3), (B3) and (D3) (hereinafter referred to as "Embodiment III"):
(A3): a urethane(meth)acrylate
(B3): one or more (meth)acrylic acid derivative monomers selected from the group consisting of n-(meth)acryloyloxy-alkyl hexahydrophthalimides, carboxyl group-containing (meth)acrylates and (meth)acrylic acid derivative monomers represented by the general formula (C3):

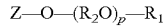  General Formula (C3):

wherein Z represents a (meth)acryloyl group, $R_1$ a phenyl group or a phenyl group having an alkyl group with 1 to 3 carbons, $R_2$—$C_2H_4$—, —$C_3H_6$—, —$CH_2CH(CH_3)$—, —$CH_2CH(OH)CH_2$—, —$C_4H_8$— or —$C_6H_{12}$—, and p an integer of from 1 to 10.
D(3): a photopolymerization initiator
12. The composition according to the above-mentioned 11, wherein the urethane(meth)acrylate of (A3) is water-soluble.
13. An adhesive comprising the composition as defined in the above-mentioned 11 or 12.
14. A method for temporarily fixing a member, comprising bonding the member with use of an adhesive that reduces adhesive strength through contact with water, curing the adhesive to temporarily fix the member, processing the temporarily fixed member, and immersing the processed member in water, thereby removing the cured adhesive.
15. A method for temporarily fixing a member, characterized by comprising bonding the member with use of an adhesive that reduces adhesive strength through contact with water, curing the adhesive to temporarily fix the member, processing the temporarily fixed member, and immersing the processed member in water to effect swelling thereof, thereby removing the cured adhesive in the form of a film.
16. A method for temporarily fixing a member, characterized by comprising bonding the member with use of the adhesive as defined in the above-mentioned 13, curing the adhesive to temporarily fix the member, processing the temporarily fixed member, and immersing the processed member in water to effect swelling thereof, thereby removing the cured adhesive in the form of a film.

Effect of the Invention

The composition of the present invention is photocurable by virtue of its composition and is cured with visible light or ultraviolet rays. Therefore, the composition of the present invention is considerably superior in laborsaving, energy saving and work reduction during the bonding operation to the conventional hot-melt type adhesives. Furthermore, the cured resin of the composition shows a high adhesive strength without being affected by cutting water or the like used in processing, and thus provides an effect that displacement is unlikely to occur during processing of a member and it is thus easy to obtain the member excellent in dimensional accuracy. Furthermore, the cured resin has a feature of reducing the adhesive strength through contact with water, preferably with warm water of at least 30° C., particularly with warm water of at most 90° C. to reduce the bonding strength between members or between the member and a jig, thereby facilitating recovery of the member. As compared with the conventional adhesives, it provides an excellent effect that it is unnecessary to use an organic solvent which is expensive, is highly combustible or generates a gas harmful to human bodies. Furthermore, in the case of the composition within the specific preferred composition range, the cured resin swells through contact with warm water of at most 90° C., and is recovered in the form of a film from the member, thereby providing an effect of excellent workability.

Since the temporary fixation method of the member according to the present invention uses the composition reducing the adhesive strength through contact with water, preferably with warm water of at most 90° C., or the adhesive comprising the composition, as described above, the present invention has the feature of capability of recovering the member only through contact with warm water, and, as compared with the conventional adhesives, it provides the significant effect that it is unnecessary to use an organic solvent which is expensive, is highly combustible or generates a gas harmful to human bodies.

BEST MODE FOR CARRYING OUT THE INVENTION

The present invention includes preferred Embodiment (I), Embodiment (II) and Embodiment (III) as described below.

Embodiment (I)

Examples of the (meth)acrylate of (A1) with a molecular weight of at least 500 having at least one (meth)acryloyl group at a terminal or in a side chain of a molecule, used in Embodiment (I), include (meth)acrylates obtained by acryloylating at least one terminal or side chain of an oligomer/polymer with a molecular weight of at least 500, such as 1,2-polybutadiene-terminated urethane(meth)acrylates (e.g., TE-2000 and TEA-1000 manufactured by Nippon Soda Co., Ltd.), their hydrogenated products (e.g., TEAI-1000 manufactured by Nippon Soda Co., Ltd.), 1,4-polybutadiene-terminated urethane(meth)acrylates (e.g., BAC-45 manufactured by OSAKA ORGANIC CHEMICAL INDUSTRY LTD.), polyisoprene-terminated (meth)acrylates, polyester urethane(meth)acrylates, polyether urethane(meth)acrylates, polyester(meth)acrylates or bis A type epoxy(meth)acrylates (e.g., Biscoat #540 manufactured by OSAKA ORGANIC CHEMICAL INDUSTRY LTD., and Biscoat VR-77 manufactured by SHOWA HIGH POLYMER CO., LTD.).

(A1) preferably comprises at least one member selected from the group consisting of polybutadiene, polyisoprene and hydrogenated products thereof because it enhances a property that when a cured resin of the composition is immersed in warm water, the cured resin is removed from an adherend (hereinafter referred to simply as "removability").

In the present invention, an amount of the (meth)acrylate of (A1) to be added is preferably from 5 to 80 parts by mass, particularly preferably from 5 to 60 parts by mass, relative to 100 parts by mass of the total amount of (A1), (B1) and (C1). When the amount to be added is at least 5 parts by mass, the removability is sufficient and it is secure to remove the cured resin of the composition in the form of a film. On the other hand, when the amount is at most 80 parts by mass, it is feasible to prevent increase of viscosity and reduction of workability thereby.

The (meth)acrylate of (A1) is preferably hydrophobic. If it is water-soluble, the cured resin of the composition could swell or dissolve in part during cutting, so as to induce displacement and degrade machining accuracy, such being undesirable. However, it can be hydrophilic unless the cured resin of the composition significantly swells or dissolves in part with water.

Examples of the polyfunctional (meth)acrylate of (B1) include the following bifunctional (meth)acrylates: 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, 2-ethyl-2-butyl-propanediol (meth)acrylate, neopentyl glycol-modified trimethylol propane di(meth)acrylate, stearic acid-modified pentaerythritol diacrylate, polypropylene glycol di(meth)acrylate, 2,2-bis(4-(meth)acryloxy diethoxyphenyl)propane, 2,2-bis(4-(meth)acryloxy propoxyphenyl)propane, 2,2-bis(4-(meth)acryloxy tetraethoxyphenyl)propane, and so on. Further, examples of (B1) include the following trifunctional (meth)acrylates: trimethylol propane tri(meth)acrylate, tris[(meth)acryloxyethyl]isocyanurate, and so on. Examples of tetrafunctional and higher-functional (meth)acrylates include dimethylolpropane tetra(meth)acrylate, pentaerythritol tetra(meth)acrylate, pentaerythritol ethoxy tetra(meth)acrylate, dipentaerythritol penta(meth)acrylate, dipentaerythritol hexa(meth)acrylate, and so on.

An amount of the polyfunctional (meth)acrylate of (B1) to be added is preferably from 1 to 50 parts by mass, particularly preferably from 5 to 30 parts by mass, relative to 100 parts by mass of the total amount of (A1), (B1) and (C1). When the amount to be added is at least 1 part by mass, the removability is sufficient and it is secure to remove the cured resin of the composition in the form of a film. On the other hand, when the amount is at most 50 parts by mass, the initial adhesion can be maintained well.

The polyfunctional (meth)acrylate of (B1) is more preferably hydrophobic as well as (A1) was. If it is water-soluble, the cured resin of the composition could swell during cutting, so as to induce displacement and degrade machining accuracy, such being undesirable. However, it can be hydrophilic unless the cured resin of the composition significantly swells or dissolves in part with water.

Examples of the (meth)acrylate of (C1) other than said (A1) and (B1) include methyl(meth)acrylate, ethyl(meth)acrylate, propyl(meth)acrylate, butyl(meth)acrylate, 2-ethylhexyl(meth)acrylate, isooctyl(meth)acrylate, isodecyl(meth)acrylate, lauryl(meth)acrylate, stearyl(meth)acrylate, phenyl(meth)acrylate, cyclohexyl(meth)acrylate, dicyclopentanyl(meth)acrylate, dicyclopentenyl(meth)acrylate, dicyclopentenyloxyethyl(meth)acrylate, isobornyl(meth)acrylate, methoxylated cyclodecatriene(meth)acrylate, 2-hydroxyethyl(meth)acrylate, 2-hydroxypropyl(meth)acrylate, 3-hydroxypropyl(meth)acrylate, 4-hydroxybutyl(meth)acrylate, tetrahydrofurfuryl(meth)acrylate, 2-hydroxy-3-phenoxypropyl(meth)acrylate, glycidyl(meth)acrylate, caprolactone-modified tetrahydrofurfuryl(meth)acrylate, 3-chloro-2-hydroxypropyl(meth)acrylate, N,N-dimethylaminoethyl(meth)acrylate, N,N-diethylaminoethyl(meth)acrylate, t-butylaminoethyl(meth)acrylate, ethoxycarbonylmethyl(meth)acrylate, phenol ethylene oxide-modified acrylate, phenol (2-mol ethylene oxide-modified) acrylate, phenol (4-mol ethylene oxide-modified) acrylate, paracumylphenol ethylene oxide-modified acrylate, nonylphenol ethylene oxide-modified acrylate, nonylphenol (4-mol ethylene oxide-modified) acrylate, nonylphenol (8-mol ethylene oxide-modified) acrylate, nonylphenol (2.5-mol propylene oxide-modified) acrylate, 2-ethylhexyl carbitol acrylate, ethylene oxide-modified phthalic acid (meth)acrylate, ethylene oxide-modified succinic acid (meth)acrylate, trifluoroethyl(meth)acrylate, acrylic acid, methacrylic acid, maleic acid, fumaric acid, ω-carboxy-polycaprolactone mono(meth)acrylate, phthalic acid monohydroxyethyl(meth)acrylate, (meth)acrylic acid dimer, β-(meth)acroyloxyethyl hydrogen succinate, n-(meth)acryloyloxyalkyl hexahydrophthalimide, and so on.

An amount of the (meth)acrylate of (C1) to be added is preferably from 5 to 80 parts by mass, particularly preferably from 10 to 80 parts by mass, relative to 100 parts by mass of the total amount of (A1), (B1) and (C1). When the amount to be added is at least 5 parts by mass, the initial adhesion can be maintained well. On the other hand, when the amount is at most 80 parts by mass, the removability can be secured well, so that the cured resin of the composition can be removed in the form of a film.

The (meth)acrylate of (C1) is more preferably hydrophobic as well as (A1) and (B1). Particularly, it is further preferred that all of (A1), (B1) and (C1) be hydrophobic. If it is water-soluble, the cured resin of the composition could swell during cutting, so as to induce displacement and degrade machining accuracy. This can be securely prevented by the hydrophobic (meth)acrylate. It can be hydrophilic unless the cured resin of the composition swells or dissolves in part with water.

The adhesion to a metal surface can be further improved by using the composition blended from said (A1), (B1) and (C1) in combination with a phosphate having a vinyl group or (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate and (meth)acryloyloxyethyl polyethylene glycol acid phosphate.

The photopolymerization initiator of (D1) is blended in order to effect sensitization with active rays such as visible light or ultraviolet rays to enhance the photocuring property of the composition, and can be one of various known photopolymerization initiators. Specific examples of the photopolymerization initiator include benzophenone and its derivatives, benzyl and its derivatives, anthraquinone and its derivatives, benzoin and benzoin derivatives such as, benzoin methyl ether, benzoin ethyl ether, benzoin propyl ether, benzoin isobutyl ether and benzyl dimethyl ketal, acetophenone derivatives such as diethoxyacetophenone and 4-t-butyltrichloroacetophenone, 2-dimethylaminoethyl benzoate, p-dimethylaminoethyl benzoate, diphenyl disulfide, thioxanthone and their derivatives, camphor quinone and camphor quinone derivatives such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethylester, 7,7-dimethyl-2,3-dioxobicyclo[2.2.1]heptane-1-carboxy-2-methyl ester and 7,7-dimethyl-2,3-dioxobicyclo[2.2.1]heptane-1-carboxylic acid chloride, α-amino alkylphenone derivatives such as 2-methyl-1-[4-(methylthio)phenyl]-2-morpholino propane-1-on and 2-benzyl-2-dimethylamino-1-(4-morpholino phenyl)-butanone-1, and acyl phosphine oxide derivatives such as benzoyl diphenyl phosphine oxide, 2,4,6-trimethyl benzoyl diphenyl phosphine oxide, benzoyl diethoxyphosphine oxide, 2,4,6-trimethyl benzoyl dimethoxyphenylphosphine oxide and 2,4,6-trimethyl benzoyl diethoxyphenylphosphine oxide. The photopolymerization initiators can be used alone or in combination with two or more initiators.

An amount of the photopolymerization initiator of (D1) to be added is preferably from 0.1 to 20 parts by mass, relative to 100 parts by mass of the total amount of (A1), (B1) and (C1). The amount is more preferably from 3 to 20 parts by mass. When the amount is at least 0.1 part by mass, it is sure to achieve the effect of promoting the curing. On the other hand, when the amount is at most 20 parts by mass, a sufficient curing rate can be assured. A more preferred embodiment is such that (D1) is added by at least 3 parts by mass, which is further preferred in that the composition becomes curable regardless of an light irradiation amount, a crosslinking degree of the cured resin of the composition becomes higher, no displacement occurs during cutting, and the removability is improved.

In order to improve the storage stability, the composition according to the present invention can contain a small amount of a polymerization inhibitor. Examples of the polymerization inhibitor include methyl hydroquinone, hydroquinone, 2,2-methylene-bis(4-methyl-6-tertiary-butyl phenol), catechol, hydroquinone monomethyl ether, monotertiary butylhydroquinone, 2,5-ditertiary butylhydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxy anisole, 2,6-ditertiary-butyl-p-cresol, and so on.

An amount of the polymerization inhibitor to be used is preferably from 0.001 to 3 parts by mass, more preferably from 0.01 to 2 parts by mass, relative to 100 parts by mass of the total amount of (meth)acrylates (A1), (B1) and (C1). When the amount is at least 0.001 part by mass, the storage stability can be secured. On the other hand, when the amount is at most 3 parts by mass, good adhesion can be obtained and the composition can be prevented from being uncured.

The composition of the present invention may contain an additive such as an elastomer selected from various ones, e.g., acryl rubber, urethane rubber and acrylonitrile-butadiene-styrene rubber, an inorganic filler, a solvent, an extender, a reinforcing material, a plasticizer, a thickener, a dye, a pigment, a flame retardant, a silane coupling agent or a surfactant as long as it does not impair the object of the present invention.

The temporary fixation of the present invention is a method for temporarily fixing a member, which comprises bonding the member with use of the above composition, curing the composition to temporarily fix the member, processing the temporarily fixed member and immersing the processed member in warm water to remove the cured composition. By virtue of the method, various members such as optical members can be processed with high machining accuracy, without use of an organic solvent.

According to a preferred embodiment of the present invention, the cured resin is brought into contact with warm water of at most 90° C. in removal of the composition to swell and is removed in the form of a film from the member, thereby obtaining an effect of excellent workability.

In the temporary fixation method of the present invention, it is preferred to use an adhesive comprising the composition of the present invention, because the above effect of the invention can be certainly obtained.

In the present invention, use of warm water appropriately heated to at most 90° C. is preferred in terms of productivity because the satisfactory removability is achieved in a short period of time. With respect to the above-mentioned temperature of the warm water, it is preferred to use warm water of from 30° C. to 80° C., preferably from 40° C. to 80° C. because the cured resin of the composition becomes swollen in a short period of time and the residual stress in curing of the composition is released to reduce the adhesive strength, thereby enabling the cured resin of the composition to be removed in the form of a film. A recommendable method for bringing the cured resin into contact with the warm water is a method of immersing the whole of the bonded member in the warm water, which is simple.

In the present invention, there are no particular restrictions on a material of the member to be temporarily fixed, and in a case where the adhesive is an ultraviolet-curable adhesive, the member is preferably one made of a UV transmitting material. Examples of the material include crystalline quartz members, glass members and plastic members, and thus the temporary fixation method of the present invention can be applied to temporary fixation in processing of crystal oscillators, glass lenses, plastic lenses and optical disks.

With respect to how to use the adhesive in the temporary fixation method, assuming that the adhesive is a photocurable one, the following method can be adopted: the adhesive is first applied e.g., by a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace to be applied, and thereafter the members are exposed to visible light or ultraviolet rays to cure the photocurable adhesive to temporarily fix the members.

Thereafter, the temporarily fixed members are subjected to processing such as cutting, grinding, polishing or drilling into a desired shape, and then the members are immersed in warm water, whereby the cured resin of the composition can be removed from the members.

Embodiment (II)

The (meth)acrylate of (A2) with a molecular weight of at least 500 having at least one (meth)acryloyl group at a terminal or in a side chain of a molecule, used in this Embodiment (II), can be one selected from the compounds exemplified as the component (A1) used in the above Embodiment (I). Thus, exemplification is omitted here.

(A2) preferably comprises at least one member selected from the group consisting of polybutadiene, polyisoprene and hydrogenated products thereof because it enhances the property that when a cured resin of the composition is immersed in warm water, the cured resin is removed from an adherend (removability).

In the present invention, an amount of the (meth)acrylate of (A2) to be added is preferably from 1 to 50 parts by mass, particularly preferably from 5 to 45 parts by mass, relative to 100 parts by mass of the total amount of (A2), (B2) and (C2). When the amount to be added is at least 1 part by mass, the removability is sufficient and it is secure to remove the cured resin of the composition in the form of a film. On the other hand, when the amount is at most 50 parts by mass, the initial adhesion can be maintained well.

The (meth)acrylate of (A2) is preferably hydrophobic. If it is water-soluble, the cured resin of the composition could swell or dissolve in part during cutting, so as to induce displacement and degrade machining accuracy, such being undesirable. However, it can be hydrophilic unless the cured resin of the composition significantly swells or dissolves in part with water.

The polyfunctional (meth)acrylate of (B2) to be used, can be one selected from the compounds exemplified as the component (B1) used in the above Embodiment (I), i.e., the compounds exemplified as the examples of the bifunctional (meth)acrylates, trifunctional (meth)acrylates and tetra- and higher-functional (meth)acrylates. Thus, exemplification is omitted here.

An amount of the polyfunctional (meth)acrylate of (B2) to be added is preferably from 1 to 50 parts by mass, particularly preferably from 5 to 40 parts by mass, relative to 100 parts by mass of the total amount of (A2), (B2) and (C2). When the amount to be added is at least 1 part by mass, the removability is sufficient and it is secure to remove the cured resin of the composition in the form of a film. On the other hand, when the amount is at most 50 parts by mass, the initial adhesion can be maintained well.

The polyfunctional (meth)acrylate of (B2) is more preferably hydrophobic as (A2) was. If it is water-soluble, the cured resin of the composition could swell during cutting, so as to induce displacement and degrade the machining accuracy, such being undesirable. However, it can be hydrophilic unless the cured resin of the composition significantly swells or dissolves in part with water.

The (meth)acrylate monomer of (C2) to be used may be one selected from the compounds as exemplified as the component (C1) used in the above Embodiment (I). Thus, exemplification is omitted here.

An amount of the (meth)acrylate of (C2) to be added is preferably from 5 to 95 parts by mass, particularly preferably from 10 to 80 parts by mass, relative to 100 parts by mass of the total amount of (A2), (B2) and (C2). When the amount to be added is at least 5 parts by mass, the initial adhesion can be maintained well. On the other hand, when the amount is at most 95 parts by mass, the removability can be secured well, so that the cured resin of the composition can be removed in the form of a film.

The (meth)acrylate of (C2) is more preferably hydrophobic as well as (A2) and (B2). Particularly, it is further preferred that all of (A2), (B2) and (C2) be hydrophobic. If it is water-soluble, the cured resin of the composition could swell during cutting, so as to induce displacement and degrade machining accuracy. This can be securely prevented by the hydrophobic (meth)acrylate. It can be hydrophilic, unless the cured resin of the composition swells or dissolves in part with water.

The adhesion to a metal surface can be further improved by using the composition blended from said (A2), (B2) and (C2) in combination with a phosphate having a vinyl group or (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate and (meth)acryloyloxyethyl polyethylene glycol acid phosphate.

The photopolymerization initiator of (D2) is blended in order to effect sensitization with active rays such as visible light or ultraviolet rays to enhance photocuring property of the composition, and can be one of various known photopolymerization initiators. Specific examples include the compounds as exemplified as the photopolymerization initiator of (D1) used in the above Embodiment (I). Thus, exemplification is omitted here. The photopolymerization initiators can be used alone or in combination with two or more initiators.

An amount of the photopolymerization initiator of (D2) to be added is preferably from 0.1 to 20 parts by mass relative to 100 parts by mass of the total amount of (A2), (B2) and (C2). The amount is more preferably from 3 to 20 parts by mass. When the amount is at least 0.1 part by mass, it is sure to achieve the effect of promoting the curing. On the other hand, when the amount is at most 20 parts by mass, a sufficient curing rate can be assured. A more preferred embodiment is such that (D2) is added by at least 3 parts by mass, which is further preferred in that the composition becomes curable regardless of an light irradiation amount, a crosslinking degree of the cured resin of the composition becomes high, no displacement occurs during cutting, and the removability is improved.

The present invention is characterized in that the polar organic solvent of (E2) is used in combination with (A2), (B2) and (C2), and this can surely develop the phenomenon in which the composition after cured readily swells through contact with warm water to reduce the adhesive strength.

The polar organic solvent of (E2) preferably has a boiling point of from 50° C. to 130° C. When the polar organic solvent is selected as one with a boiling point within the above range, it can more securely develop the phenomenon in which the composition after cured decreases the adhesive strength through contact with warm water, such being undesirable. Furthermore, the polar organic solvent may be one selected, for example, from alcohols, ketones, esters, and so on, and among those, an alcohol is preferably selected according to the Inventor's research result.

Examples of the alcohol include methanol, ethanol, n-propanol, isopropanol, n-butanol, isobutanol, secondary butanol, tertiary butanol, n-amyl alcohol, isoamyl alcohol, 2-ethylbutyl alcohol, and so on. Furthermore, alcohols preferably applicable among the above alcohols are methanol, ethanol, n-propanol, isopropanol, n-butanol, isobutanol, secondary butanol and tertiary butanol with a boiling point of at most 120° C., and further preferred alcohols among them are methanol, ethanol, isopropanol and n-butanol.

An amount of the polar organic solvent of (E2) to be added is preferably from 0.5 to 10 parts by mass relative to 100 parts by mass of the total amount of (A2), (B2) and (C2). When the amount is at least 0.5 part by mass, the removability can be secured well. On the other hand, when the amount is at most 10 parts by mass, the initial adhesion can be maintained well and the cured resin of the composition can be removed in the form of a film.

The composition according to the present invention can contain a small amount of a polymerization inhibitor in order to improve the storage stability. Specific examples of the polymerization inhibitor to be used include the compounds as exemplified as the polymerization inhibitor used in the above Embodiment (I). Thus, exemplification is omitted here.

An amount of the polymerization inhibitor to be used is preferably from 0.001 to 3 parts by mass, more preferably from 0.01 to 2 parts by mass, relative to 100 parts by mass of the total amount of (A2), (B2) and (C2). When the amount is at least 0.001 part by mass, the storage stability can be secured. On the other hand, when the amount is at most 3 parts by mass, good adhesion can be obtained and the composition can be prevented from being uncured.

The composition of the present invention may contain an additive generally used, such as an elastomer selected from various ones, e.g., acryl rubber, urethane rubber, and acrylonitrile-butadiene-styrene rubber, an inorganic filler, a solvent, an extender, a reinforcing material, a plasticizer, a thickener, a dye, a pigment, a flame retardant, a silane coupling agent or a surfactant as long as it does not impair the object of the present invention.

Further, the present invention provides a method for temporarily fixing a member, which comprises bonding the member with use of a composition reducing its adhesive strength through contact with warm water of at most 90° C.; curing the composition to temporarily fix the member; processing the temporarily fixed member; and immersing the processed member in warm water to remove the cured adhesive. By this method, various members such as optical members can be processed with high machining accuracy, without use of an organic solvent.

Furthermore, according to a preferred embodiment of the present invention, the cured resin is brought into contact with warm water of at most 90° C. in removal of the composition to swell and is removed in the form of a film from the member, thereby obtaining an effect of excellent workability.

In the temporary fixation method of the present invention, the effect of the above embodiment can be certainly obtained by using an adhesive comprising the composition of the present invention.

In the present invention, use of warm water appropriately heated, specifically warm water of at most 90° C., is preferred in terms of productivity because the removability in water achieved in a short period of time. With respect to the above-mentioned temperature of warm water, it is preferred to use warm water of from 30° C. to 90° C., preferably from 40° C. to 90° C., because the cured resin of the adhesive becomes swollen in a short period of time, the residual stress in curing of the composition is released to reduce the adhesive strength, and vapor pressure of the polar organic solvent of (E2) serves as removal force between the member and the cured resin of the composition, thereby enabling the cured resin of the adhesive to be removed in the form of a film from the adherend. A recommendable method for bringing the cured resin into contact with the water is a method of immersing the whole of the bonded member in the water, which is simple.

In the present invention, there are no particular restrictions on a material of the member to be temporarily fixed, and in a case where the adhesive is an ultraviolet-curable adhesive, the member is preferably one made of a UV transmitting material. Examples of the material include crystalline quartz members, glass members and plastic members, and thus the temporary fixation method of the present invention can be applied to temporary fixation in processing of crystal oscillators, glass lenses, plastic lenses and optical disks.

With respect to how to use the adhesive in the temporary fixation method, assuming that the adhesive is a photocurable one, the following method can be adopted: the adhesive is first applied by e.g., a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace to be applied, and thereafter the members are exposed to visible light or ultraviolet rays to cure the photocurable adhesive to temporarily fix the members.

Thereafter, the temporarily fixed members are subjected to processing such as cutting, grinding, polishing or drilling into a desired shape, and then the members are immersed in water, preferably in warm water, whereby the cured resin of the adhesive can be removed from the members.

Embodiment (III)

Embodiment (III) employs the urethane(meth)acrylate of (A3) as one of its components. The urethane(meth)acrylate of (A3) used in the present invention is obtained by reaction of a polyisocyanate, a polyol, and a (meth)acrylic acid.

Examples of the polyisocyanate include 2,4-tolylene diisocyanate, 2,6-tolylene diisocyanate, 4,4'-diphenylmethane diisocyanate, m-phenylene diisocyanate, xylylene diisocyanate, tetramethylene diisocyanate, hexamethylene diisocyanate, lysine diisocyanate ester, 1,4-cyclohexylene diisocyanate, 4,4'-dicyclohexylmethane diisocyanate, 3,3'-dimethyl-4,4'-biphenylene diisocyanate, and so on. They can be used singly or in combination with at least two kinds.

Examples of the polyol include polyester diol, polyether diol, polycaprolactone diol, polycarbonate diol, and so on.

Furthermore, the above-mentioned urethane(meth)acrylate to be used can also be a water-soluble one, and it is preferably selected in order to attain the object of the present invention.

An amount of the urethane(meth)acrylate of (A3) to be added is preferably from 5 to 80 parts by mass, particularly preferably from 5 to 50 parts by mass, relative to 100 parts by mass of the total amount of (A3) and (B3). When the above amount is at least 5 parts by mass, good adhesion can be secured. On the other hand, when the amount is at most 80 parts by mass, it can prevent the viscosity from unnecessarily increasing to reduce the workability.

The present invention employs as the component (B3), at least one (meth)acrylic acid derivative monomer selected from the group consisting of n-(meth)acryloyloxyalkyl hexahydrophthalimides, carboxyl group-containing (meth)acrylates and (meth)acrylic acid derivative monomers represented by the general formula (C3):

$$Z\text{—}O\text{—}(R_2O)_p\text{—}R_1 \qquad \text{General Formula (C3):}$$

wherein Z represents a (meth)acryloyl group, $R_1$ a phenyl group or a phenyl group having an alkyl group with 1 to 3 carbon atoms, $R_2$ —$C_2H_4$—, —$C_3H_6$—, —$CH_2CH(CH_3)$—, —$CH_2CH(OH)CH_2$—, —$C_4H_8$— or —$C_6H_{12}$—, and p an integer of from 1 to 10.

In the present invention, when used together with the above (A3), (B3) can provide an adhesive with high adhesive strength and the property of reducing the adhesive strength of the cured resin through contact with water.

Examples of the n-(meth)acryloyloxyalkyl hexahydrophthalimide include n-(meth)acryloyloxyethyl hexahydrophthalimide, n-(meth)acryloyloxypropyl hexahydrophthalimide, n-(meth)acryloyloxybutyl hexahydrophthalimide, and so on.

In a case where n-(meth)acryloyloxyalkyl hexahydrophthalimide is selected as the component (B3), the content thereof is preferably from 10 to 60 parts by mass, particularly preferably from 20 to 60 parts by mass, relative to 100 parts by mass of the total amount of (A3) and (B3). When the amount to be added is at least 10 parts by mass, the satisfactory adhesive strength can be secured in bonding of a member. When it is at most 60 parts by mass, the removability of the cured resin can be secured when immersed in water.

Furthermore, the present invention permits a carboxyl group-containing (meth)acrylate to be selected as the component (B3).

Examples of the carboxyl group-containing (meth)acrylate include acrylic acid, methacrylic acid, maleic acid, fumaric acid, ω-carboxy-polycaprolactone mono(meth)acrylate, phthalic acid monohydroxyethyl(meth)acrylate, (meth)acrylic acid dimer, β-(meth)acroyloxyethyl hydrogen succinate, and so on.

When the carboxyl group-containing (meth)acrylate is used, an amount to be added is preferably from 1 to 50 parts by mass, particularly preferably from 5 to 40 parts by mass, relative to 100 parts by mass of the total amount of (A3) and (B3). When the amount is at least 1 part by mass, the adhesion can be surely secured well. On the other hand, when the amount is at most 50 parts by mass, the removability in water can be secured well.

In addition, the present invention can select the (meth)acrylic acid derivative monomer having the structure of the general formula (C3) as the component (B3):

$$Z-O-(R_2O)_p-R_1 \quad \text{General Formula (C3):}$$

wherein Z represents a (meth)acryloyl group, $R_1$ a phenyl group or a phenyl group having an alkyl group with 1 to 3 carbon atoms, $R_2$ —$C_2H_4$—, —$C_3H_6$—, —$CH_2CH(CH_3)$—, —$CH_2CH(OH)CH_2$—, —$C_4H_8$— or —$C_6H_{12}$—, and p an integer of from 1 to 10.

Examples of the (meth)acrylic acid derivative monomer having the structure of the general formula (C3) include phenoxyethyl(meth)acrylate, phenoxy diethylene glycol(meth)acrylate, phenoxy polyethylene glycol(meth)acrylate, phenoxypropyl(meth)acrylate, 2-hydroxy-3-phenoxy propyl (meth)acrylate, phenoxy dipropylene glycol(meth)acrylate, phenoxy polypropylene glycol(meth)acrylate, and so on.

An amount of the (meth)acrylic acid derivative monomer having the structure of the general formula (C3) to be added is preferably from 10 to 80 parts by mass, particularly preferably from 10 to 70 parts by mass, relative to 100 parts by mass of the total amount of (A3) and (B3). When the amount is at least 10 parts by mass, the high adhesion can be secured well; and when the amount is at most 80 parts by mass, the removability in water can be secured well.

The adhesion to a metal surface can be further improved by using the composition of said (A3) and (B3) in combination with a phosphate having a vinyl group or (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate and (meth)acryloyloxyethyl polyethylene glycol acid phosphate.

In the present invention, the photopolymerization initiator of (D3) is added to the above components (A3) and (B3). This provides the composition with the photocurable property in addition to the high adhesive strength and the property of reducing the adhesive strength of the cured resin through contact with water, whereby the present invention can provide an adhesive suitably applicable to optical members.

The photopolymerization initiator of (D3) is blended in order to effect sensitization with active rays such as visible light or ultraviolet rays to enhance photocuring property of the resin composition, and can be one of various known photopolymerization initiators. Specific examples include the compounds as exemplified as the photopolymerization initiator of (D1) to be used in the above Embodiment (I). Thus, exemplification is omitted here. The photopolymerization initiators can be used alone or in combination with two or more initiators.

An amount of the photopolymerization initiator of (D3) to be added is preferably from 0.1 to 20 parts by mass, particularly preferably from 0.5 to 15 parts by mass, relative to 100 parts by mass of the total of (A3) and (B3). When the above-mentioned amount is at least 0.1 part by mass, the effect of promoting curing can result. On the other hand, when the amount is at most 20 parts by mass, a sufficient curing rate can be achieved.

The composition of the present invention can contain a small amount of a polymerization inhibitor in order to improve the storage stability. Specific examples of the polymerization inhibitor to be used include the compounds as exemplified as the polymerization inhibitor to be used in the above Embodiment (I). Thus, exemplification is omitted here.

An amount of the polymerization inhibitor to be used is preferably from 0.001 to 3 parts by mass, more preferably from 0.01 to 2 parts by mass, relative to 100 parts by mass of the total amount of (A3) and (B3). When the amount is at least 0.001 part by mass, the storage stability can be secured. On the other hand, when the amount is at most 3 parts by mass, the composition can be prevented from being uncured and good adhesion can be obtained.

The composition of the present invention may contain an additive generally used such as an elastomer selected from various ones, e.g., acryl rubber, urethane rubber, and acrylonitrile-butadiene-styrene rubber, an inorganic filler, a solvent, an extender, a reinforcing material, a plasticizer, a thickener, a dye, a pigment, a flame retardant, a silane coupling agent or a surfactant as long as it does not impair the object of the present invention.

Further, the present invention provides a method for temporarily fixing a member, which comprises bonding the member with use of an adhesive reducing its adhesive strength through contact with water, particularly with warm water at least 30° C.; curing the adhesive to temporarily fix the members; processing the temporarily fixed member; and immersing the processed member in warm water to remove the cured adhesive. By this method, various members such as optical members can be processed with high machining accuracy, without use of an organic solvent.

Furthermore, according to a preferred embodiment of the present invention, the cured resin is brought into contact with water in removal of the adhesive to swell and is removed in the form of a film from the member, thereby obtaining an effect of excellent workability.

In the temporary fixation of the present invention, the effect of the above invention can be certainly obtained by using an adhesive comprising the composition of the present invention, such being preferred.

In the present invention, there is no problem that the temperature of water is usually at room temperature, but use of warm water appropriately heated is preferred in terms of productivity because the satisfactory removability in water is achieved in a short period of time. With respect to the above-mentioned temperature of the warm water, it is preferred to use warm water of from 30° C. to 90° C., preferably from 40° C. to 80° C. because the cured resin of the adhesive becomes swollen in a short period of time to reduce the adhesive strength, thereby enabling the cured resin of the adhesive to be removed in the form of a film. Furthermore, a recommendable method for bringing the cured resin into contact with the water is a method of immersing the whole of the bonded member in water, which is simple.

In the present invention, there are no particular restrictions on a material of the member to be temporarily fixed, and in a case where the adhesive is an ultraviolet-curable adhesive, the member is preferably one made of a UV transmitting material. Examples of the material include crystalline quartz members, glass members and plastic members, and thus the temporary fixation method of the present invention can be applied to temporary fixation in processing of crystal oscillators, glass lenses, plastic lenses and optical disks.

With respect to how to use the adhesive in the temporary fixation method, assuming that the adhesive is a photocurable one, the following method can be adopted: the adhesive is first applied e.g., by a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace to be applied, and thereafter the members are exposed to visible light or ultraviolet rays to cure the photocurable adhesive to temporarily fix the members.

Thereafter, the temporarily fixed members are subjected to processing such as cutting, grinding, polishing or drilling into a desired shape, and then the members are immersed in water, preferably in warm water, whereby the cured resin of the adhesive can be removed from the members.

EXAMPLES

Now, the present invention will be described in detail with reference to Examples and Comparative Examples, but it should be understood that the present invention is by no means restricted to such Examples. Evaluation methods used in Examples below are as follows.

Evaluation Methods

Tensile Shear Bond Strength: the strength was measured in accordance with JIS K 6850. Specifically, Pyrex (registered trademark for heat resistant glass manufactured by Corning Incorporated) glass (25 mm length×25 mm width×2.0 mm thickness) was used as an adherend, and two sheets of the Pyrex glass were bonded in a bonding area with a diameter of 8 mm with a composition prepared. Then, the composition was cured by a curing apparatus using an electrodeless discharge lamp, manufactured by Fusion UV Systems Inc., under a condition of an accumulated quantity of light of 2000 mJ/cm$^2$ at a wavelength of 365 nm, thereby preparing a test piece for tensile shear bond strength. The test piece thus prepared was subjected to measurement of tensile shear bond strength by means of a universal testing machine under a temperature of 23° C. and a humidity of 50% at a pulling rate of 10 mm/min.

Removing Test: a test piece for the removing test was prepared by curing the composition in the same condition as above except that the composition prepared was applied onto the above Pyrex glass and bonded to a blue sheet glass (150 mm length×150 mm width×1.7 mm thickness) as a substrate. The test piece obtained was immersed in warm water (80° C.), a period of time to removal of the Pyrex glass was measured, and a removal state thereof was also observed.

Example 1-1

A composition was prepared by adding 10 parts by mass of benzyl dimethyl ketal (hereinafter abbreviated as "BDK") as the photopolymerization initiator of (D1) and 0.1 part by mass of 2,2-methylene-bis(4-methyl-6-tertiary butyl phenol) (hereinafter abbreviated as "MDP") as a polymerization inhibitor to a total amount of 100 parts by mass consisting of 20 parts by mass of 1,2-polybutadiene-terminated urethane methacrylate (TE-2000 manufactured by Nippon Soda Co., Ltd., hereinafter abbreviated as "TE-2000") as the (meth) acrylate of (A1) with the molecular weight of at least 500 having at least one (meth)acryloyl group at a terminal or in a side chain of a molecule, 15 parts by mass of dicyclopentanyl diacrylate (KAYARA D R-684 manufactured by Nippon Kayaku Co., Ltd., hereinafter abbreviated as "R-684") as the polyfunctional (meth)acrylate of (B1), 40 parts by mass of n-acryloyloxyethyl hexahydrophthalimide (TO-1429 manufactured by TOAGOSEI CO., LTD., hereinafter abbreviated as "TO-1429") as the (meth)acrylate of (C1) other than (A1) and (B1) and 25 parts by mass of phenoxy ethyl acrylate (Light Acrylate PO-A manufactured by Kyoeisha Chemical Co., Ltd., hereinafter abbreviated as "PO-A"). The measurement of tensile shear bond strength and the removing test were carried out using the composition prepared. Table 1-1 shows the results of those tests.

TABLE 1-1

| Example No. | 1-1 | 1-2 | 1-3 | 1-4 | 1-5 | 1-6 | 1-7 | 1-8 | 1-9 | 1-10 | 1-11 |
|---|---|---|---|---|---|---|---|---|---|---|---|
| (A1) component (parts by mass) | | | | | | | | | | | |
| TE-2000 | 20 | 20 | 20 | 35 | | 50 | 20 | 20 | 20 | 20 | 20 |
| TEA-1000 | | | | | 20 | | | | | | |
| (B1) component (parts by mass) | | | | | | | | | | | |
| R-684 | 15 | 15 | 15 | 15 | 15 | 5 | | | 15 | 15 | 15 |
| TMPTA | | | | | | | 15 | | | | |
| NPA | | | | | | | | 15 | | | |
| (C1) component (parts by mass) | | | | | | | | | | | |
| TO-1429 | 40 | 40 | 40 | 25 | 40 | 25 | 40 | 40 | 40 | 40 | 40 |
| PO-A | 25 | 25 | 25 | | 25 | 10 | | | | | |
| M-101A | | | | 25 | | | 25 | 25 | 25 | 25 | 25 |
| (D1) photopolymerization initiator (parts by mass) | | | | | | | | | | | |
| BDK | 10 | 5 | 1.5 | 10 | 10 | 10 | 10 | 10 | | | |
| TPO | | | | | | | | | 2 | | |
| I-907 | | | | | | | | | | 2 | 6 |
| Polymerization inhibitor (part by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 11.7 | 12.6 | 12.4 | 11.8 | 10.1 | 15.1 | 9.0 | 9.8 | 13.3 | 9.8 | 11.3 |
| Period to removal in warm water at 80° C. (min) | 30 | 30 | 153 | 20 | 34 | 97 | 41 | 30 | 166 | 131 | 41 |
| Removed state*) | film form | film form | film form | film form | film form | film form | film form | film form | film form | film form | film form |

*)Film form: a cured resin of a composition removed in the form of a film with no adhesive residue, from a surface of glass.

Examples 1-2 to 1-11

Compositions were prepared in the same manner as in Example 1-1 except that raw materials of types as identified in Table 1-1 were used in compositions as identified in Table 1-1. The measurement of tensile shear bond strength and the removing test were carried out in the same manner as in Example 1-1, using the compositions prepared. Table 1-1 shows the results of those.

Materials Used

TEA-1000: 1,2-polybutadiene-terminated urethane acrylate (TEA-1000 manufactured by Nippon Soda Co., Ltd.)

TMPTA: trimethylol propane triacrylate (KAYARAD TMPTA manufactured by Nippon Kayaku Co., Ltd.)

NPA: neopentyl glycol diacrylate (Light Acrylate NP-A manufactured by Kyoeisha Chemical Co., Ltd.)

M-101A: phenol 2-mol ethylene oxide-modified acrylate (ARONIX M-101A manufactured by TOAGOSEI CO., LTD.)

TPO: 2,4,6-trimethyl benzoyl diphenyl phosphine oxide (Lucirin TPO manufactured by BASF)

1-907: 2-methyl-1-[4-(methylthio)phenyl]-2-morpholino propan-1-on (IRGACURE907 manufactured by Ciba Specialty Chemicals K.K.)

Comparative Examples 1-1 to 1-4

Compositions were prepared in the same manner as in Example 1-1 except that raw materials of types as identified in Table 1-2 were used in compositions as identified in Table 1-2. The measurement of tensile shear bond strength and the removing test were carried out in the same manner as in Example 1-1 for the compositions prepared. Table 1-2 shows the results of those.

TABLE 1-2

|  | Comparative example No. | | | |
|---|---|---|---|---|
|  | 1-1 | 1-2 | 1-3 | 1-4 |
| (A1) component (parts by mass) | | | | |
| TE-2000 | 20 | 0 | | |
| (B1) component (parts by mass) | | | | |
| R-684 | 0 | 0 | | |
| (C1) component (parts by mass) | | | | |
| TO-1429 | 40 | 60 | | |
| PO-A | 40 | 40 | | |
| Other components (parts by mass) | | | | |
| MTEGMA | | | | 70 |
| Acryloyl morpholine | | | 100 | 30 |
| (D1) photopolymerization initiator (parts by mass) | | | | |
| BDK | 10 | 10 | 1.5 | |
| TPO | | | | 2.0 |

TABLE 1-2-continued

|  | Comparative example No. | | | |
|---|---|---|---|---|
|  | 1-1 | 1-2 | 1-3 | 1-4 |
| Polymerization inhibitor (part by mass) | | | | |
| MDP | 0.1 | 0.1 | 0.1 | 0.1 |
| Adhesive strength (MPa) | 18.6 | 9.8 | 2.0 | 8.4 |
| Period to removal in warm water at 80° C. (min) | not removed | not removed | 30 | 60 |
| Removed state** | | | adhesive residue | adhesive residue |

**)Adhesive residue: a cured resin of a composition remained on a surface of glass, though glass was separated.

Material Used

MTEGMA: methoxy tetraethylene glycol monomethacrylate (NK Ester M-90G manufactured by SHIN NAKAMURA CHEMICAL CO., LTD.)

Example 1-12

The measurement of tensile shear bond strength and the removing test were carried out in the same manner as in Example 1-1 except that the test pieces for the removing test and for the measurement of tensile shear bond strength were prepared in such a manner that the compositions were made by different amounts of the photopolymerization initiator (D1) in Examples 1-1, 1-2 and 1-11 and they were used and cured by means of a curing apparatus using an electrodeless discharge lamp, manufactured by Fusion UV Systems Inc. under different accumulated light quantities of 200, 500, 1000 and 4000 mJ/cm$^2$ at a wavelength of 365 nm. As a result, each composition maintained good adhesive strength in each accumulated quantity of light and showed good removability. Table 1-3 shows the results of those.

TABLE 1-3

| Accumulated irradiation amount (mJ/cm$^2$) | | Example No. | | |
|---|---|---|---|---|
|  |  | 1-1 | 1-2 | 1-11 |
| 200 | Adhesive strength (MPa) | 9.8 | 10.5 | 9.8 |
|  | Period to removal (min) | 73 | 79 | 45 |
| 500 | Adhesive strength (MPa) | 11.3 | 13.7 | 11.3 |
|  | Period to removal (min) | 76 | 130 | 35 |
| 1000 | Adhesive strength (MPa) | 13.6 | 14.6 | 11.3 |
|  | Period to removal (min) | 53 | 150 | 25 |
| 4000 | Adhesive strength (MPa) | 10.9 | 10.0 | 10.6 |
|  | Period to removal (min) | 35 | 88 | 66 |

Example 1-13

Pyrex glass with 150 mm length×150 mm width×2 mm thickness and the blue sheet glass used in Example 1 as dummy glass were bonded with the composition prepared in Example 1-1 and the composition was cured in the same manner as in Example 1. Only the heat-resistant Pyrex glass portion of the adhesive test piece was cut in the size of 10 mm square by means of a dicing apparatus. Neither dropout nor loss of the Pyrex glass occurred during cutting, so as to demonstrate satisfactory processability with good chipping resistance. The adhesive test piece with the Pyrex glass portion only being cut was immersed in warm water at 80° C. and the entire adhesive was removed in 120 minutes.

Example 2-1

A composition was prepared by adding 2 parts by mass of isopropyl alcohol (hereinafter abbreviated as "IPA") as the polar organic solvent of (E2), 10 parts by mass of BDK as the photopolymerization initiator of (D2) and 0.1 part by mass of MDP as a polymerization inhibitor to the total amount of 100 parts by mass consisting of 20 parts by mass of TE-2000 as the (meth)acrylate of (A2) with a molecular weight of at least 500 having at least one (meth)acryloyl group at a terminal or in a side chain of the molecule, 15 parts by mass of R-684 as the polyfunctional (meth)acrylate of (B2), 40 parts by mass of TO-1429 as the monofunctional (meth)acrylate of (C2) other than (A1) and (B1) and 25 parts by mass of M-101A. The measurement of tensile shear bond strength and the removing test were carried out using the composition prepared. Table 2-1 shows the results of those.

TABLE 2-1

| Example No. | 2-1 | 2-2 | 2-3 | 2-4 | 2-5 | 2-6 | 2-7 | 2-8 | 2-9 | 2-10 | 2-11 |
|---|---|---|---|---|---|---|---|---|---|---|---|
| (A2) component (parts by mass) | | | | | | | | | | | |
| TE-2000 | 20 | 20 | 20 | 20 | 20 | 20 | 20 | 20 | 20 | 20 | 20 |
| (B2) component (parts by mass) | | | | | | | | | | | |
| R-684 | 15 | 15 | 15 | 15 | 15 | 15 | 15 | 15 | 15 | 15 | 15 |
| (C2) component (parts by mass) | | | | | | | | | | | |
| TO-1429 | 40 | 40 | 40 | 40 | 40 | 40 | 40 | 40 | 40 | 40 | 40 |
| M-101A | 25 | 25 | 25 | 25 | 25 | 25 | 25 | 25 | 25 | 25 | 25 |
| (E2) component | | | | | | | | | | | |
| IPA (b.p. 82° C.) | 2 | | | | 0.5 | 4 | 6 | 2 | 2 | 2 | 2 |
| Ethanol (b.p. 78° C.) | | 2 | | | | | | | | | |
| Methanol (b.p. 65° C.) | | | 2 | | | | | | | | |
| n-Butanol (b.p. from 83 to 118° C.) | | | | 2 | | | | | | | |
| (D2) photopolymerization initiator (parts by mass) | | | | | | | | | | | |
| BDK | 10 | 10 | 10 | 10 | 10 | 10 | 10 | 5 | 1.5 | | |
| TPO | | | | | | | | | | 2 | |
| I-907 | | | | | | | | | | | 2 |
| Polymerization inhibitor (part by mass) | | | | | | | | | | | |
| MDP | 0.1 | 0.1 | 0.1 | 0.1 | 0.1 | 0.1 | 0.1 | 0.1 | 0.1 | 0.1 | 0.1 |
| Adhesive strength (MPa) | 11.6 | 11.2 | 12.0 | 9.8 | 14.0 | 10.6 | 9.6 | 13.3 | 11.7 | 12.4 | 10.2 |
| Period to removal in warm water at 80° C. (min) | 20 | 25 | 22 | 32 | 44 | 16 | 10 | 44 | 79 | 48 | 75 |
| Removed state*) | film form | film form | film form | film form | film form | film form | film form | film form | film form | film form | film form |

*)Film form: a cured resin of a composition removed in the form of a film with no adhesive residue, from a surface of glass.

Examples 2-2 to 2-21

Compositions were prepared in the same manner as in Example 2-1 except that raw materials of types as identified in Table 2-1 and Table 2-2 were used in compositions as identified in Table 2-1 and Table 2-2. The measurement of tensile shear bond strength and the removing test were carried out in the same manner as in Example 2-1, using the compositions prepared. Table 2-1 and Table 2-2 show the results of those.

TABLE 2-2

| Example No. | 2-12 | 2-13 | 2-14 | 2-15 | 2-16 | 2-17 | 2-18 | 2-19 | 2-20 | 2-21 |
|---|---|---|---|---|---|---|---|---|---|---|
| (A2) component (parts by mass) | | | | | | | | | | |
| TE-2000 | 20 | 20 | 20 | 20 | 10 | 10 | 0 | 0 | 20 | 35 |
| (B2) component (parts by mass) | | | | | | | | | | |
| R-684 | 15 | 15 | 15 | 5 | 25 | 5 | 25 | 5 | 15 | 35 |
| (C2) component (parts by mass) | | | | | | | | | | |
| TO-1429 | 40 | 40 | 40 | 40 | 40 | 40 | 40 | 40 | 40 | 15 |
| QM | 25 | | | | | | | | | |
| M-101A | | | | | | | | | 25 | 15 |
| BZ | | 25 | | 35 | 25 | 45 | 35 | 55 | | |
| IBX | | | 25 | | | | | | | |
| (E2) component (parts by mass) | | | | | | | | | | |
| IPA (b.p. 82° C.) | 2 | 2 | 2 | 2 | 2 | 2 | 2 | 2 | 12 | 2 |
| (D2) photopolymerization initiator (parts by mass) | | | | | | | | | | |
| BDK | 5 | 5 | 5 | 5 | 5 | 5 | 5 | 5 | 10 | 10 |
| Polymerization inhibitor (part by mass) | | | | | | | | | | |
| MDP | 0.1 | 0.1 | 0.1 | 0.1 | 0.1 | 0.1 | 0.1 | 0.1 | 0.1 | 0.1 |
| Adhesive strength (MPa) | 13.9 | 10.8 | 9.8 | 16.3 | 10.7 | 21.2 | 12.8 | 9.5 | 3.7 | 2.8 |
| Period to removal in warm water at 80° C. (min) | 20 | 152 | 283 | 22 | 26 | 81 | 140 | 290 | 5 | 12 |
| Removed state*) | film form | film form | film form | film form | film form | film form | film form | film form | | |

*)Film form: a cured resin of a composition removed in the form of a film with no adhesive residue, from a surface of glass.

Materials Used

QM: dicyclopentenyl oxyethyl methacrylate (QM-657 manufactured by Rohm & Haas Co.)

BZ: benzyl methacrylate (Light Ester BZ manufactured by Kyoeisha Chemical Co., Ltd.)

IBX: isobornyl methacrylate (Light Ester IB-X manufactured by Kyoeisha Chemical Co., Ltd.)

Comparative Examples 2-1 to 2-5

Compositions were prepared in the same manner as in Example 2-1 except that raw materials of types as identified in Table 2-3 were used in compositions as identified in Table 2-3. The measurement of tensile shear bond strength and the removing test were carried out in the same manner as in Example 2-1, using the compositions prepared. Table 2-3 shows the results of those.

TABLE 2-3

| | Comparative Example No. | | | | |
|---|---|---|---|---|---|
| | 2-1 | 2-2 | 2-3 | 2-4 | 2-5 |
| (A2) component (parts by mass) | | | | | |
| TE-2000 | | | | | |
| (B2) component (parts by mass) | | | | | |
| R-684 | | | | | |
| (C2) component (parts by mass) | | | | | |
| TO-1429 | | | | | |
| M-101A | 40 | | | | |
| BZ | | | | | |
| IBX | 60 | | | | 30 |
| (E2) component (parts by mass) | | | | | |
| IPA | 2 | | | | |
| Other components (parts by mass) | | | | | |
| 2-HEMA | | | | | 70 |
| MTEGMA | | 100 | | 70 | |
| Acryloyl morpholine | | | 100 | 30 | |
| (D2) photopolymerization initiator (parts by mass) | | | | | |
| BDK | 5 | 1.5 | 1.5 | | |
| TPO | | | | 2.0 | 2.0 |
| Polymerization inhibitor (part by mass) | | | | | |
| MDP | 0.1 | 0.1 | 0.1 | 0.1 | 0.1 |
| Adhesive strength (MPa) | 10.5 | 2.0 | 2.0 | 8.4 | 12.3 |
| Period to removal in warm water at 80° C. (min) | not removed | 30 | 30 | 60 | not removed |
| Removed state**) | | adhesive residue | adhesive residue | adhesive residue | |

**)Adhesive residue: a cured resin of a composition remained on a surface of glass, though glass was separated.

Material Used

2-HEMA: 2-hydroxyethyl methacrylate

Example 2-22 and Comparative Example 2-6

The measurement of tensile shear bond strength and the removing test were carried out in the same manner as in Example 2-1 except that the test pieces for the removing test and for the measurement of tensile shear bond strength were prepared in such a manner that the compositions in Example 2-1 and Comparative Example 2-5 were used and they were cured by means of a curing apparatus using an electrodeless discharge lamp manufactured by Fusion UV Systems Inc., under different accumulated light quantities of 500, 1000, 2000 and 4000 mJ/cm$^2$ at a wavelength of 365 nm. Table 2-4 shows the results of those.

TABLE 2-4

| | Composition No. | | Accumulated quantity of light (mJ/cm$^2$) | | | |
|---|---|---|---|---|---|---|
| | | | 500 | 1000 | 2000 | 4000 |
| Example 2-22 | Example 2-1 | Adhesive strength (MPa) | 10.2 | 10.5 | 11.6 | 10.3 |
| | | Period to removal (min) | 16 | 15 | 20 | 10 |
| Comparative Example 2-6 | Comparative Example 2-5 | Adhesive strength (MPa) | 0 | 0 | 12.3 | 9.8 |
| | | Period to removal (min) | — | — | not removed | not removed |

Examples 2-23 and 2-24

Test pieces for the removing test were prepared using the compositions in Examples 2-1 and 2-6 in the same manner as in Example 2-1, and the removing test was carried out at different temperatures of 40° C., 50° C., 60° C. and 70° C. of warm water. Table 2-5 shows the results. It is clear from the results that satisfactory removability is exhibited at all the temperatures.

TABLE 2-5

| | Composition No. | | Temperature of warm water (° C.) | | | |
|---|---|---|---|---|---|---|
| | | | 40 | 50 | 60 | 70 |
| Example 2-23 | Example 2-1 | Period to removal (min) | 353 | 267 | 185 | 84 |
| Example 2-24 | Example 2-6 | Period to removal (min) | 192 | 143 | 99 | 70 |

Example 2-25

Pyrex glass with 150 mm×150 mm×2 mmt and the blue sheet glass used in Example 1 as dummy glass were bonded with the composition in Example 2-1 and the composition was cured in the same manner as in Example 2-1. Only the Pyrex glass portion of the adhesive test piece was cut in the size of 10 mm square by means of a dicing apparatus. No dropping of the Pyrex glass occurred during cutting, so as to demonstrate good processability. The adhesive test piece with the Pyrex glass portion only being cut was immersed in warm water at 80° C. and the entire adhesive was removed in 60 minutes. In addition, ten cut test pieces after removed were arbitrarily selected and taken, and the back side (the side temporarily fixed with the composition) of each cut test piece was observed with an optical microscope, to measure a maximum width of chip portions of glass, and to calculate an average value and a standard deviation thereof. Table 2-6 shows the results.

Comparative Example 2-7

A hot-melt type adhesive (ADFIX A manufactured by NIKKA SEIKO CO., LTD.) was heated to melt at 90° C., to bond a 150 mm×150 mm×2 mmt Pyrex glass and the blue sheet glass used in Example 1. Only the Pyrex glass portion of the bonded test piece was cut in the size of 10 mm square by means of a dicing apparatus. No dropping of the Pyrex glass occurred during cutting, so as to demonstrate good processability. The test piece was immersed in an N-methylpyrrolidone solution for one day and then cut test pieces were collected. In the same manner as in Example 25, ten cut test pieces after removed were arbitrarily selected and the back side (the side temporarily fixed with the hot-melt type adhesive) of each cut test piece was observed with an optical microscope, to measure a maximum width of chip portions of glass, and to calculate an average value and a standard deviation thereof. Table 2-6 shows the results.

Comparative Example 2-8

A 150 mm×150 mm×2 mmt Pyrex glass was bonded with a UV-curable PET adhesive tape. Only the Pyrex glass portion of the bonded test piece was cut in the size of 10 mm square by means of a dicing apparatus. The adhesive tape portion of the test piece was irradiated with ultraviolet rays, to reduce the adhesive strength, and then cut test pieces were collected. In the same manner as in Example 25, ten cut test pieces after removed were arbitrarily selected and the back side (the side temporarily fixed with the adhesive tape) of each cut test piece was observed with an optical microscope, to measure a maximum width of chip portions of glass, and to calculate an average value and a standard deviation thereof. Table 2-6 shows the results.

Example 2-26 and Comparative Examples 2-9 and 2-10

The resin compositions of Example 2-1 and Comparative Examples 2-5 and 2-6 were used herein and the resin compositions were cured in a shape of 30 mm×10 mm×1 mmt by means of a curing apparatus using an electrodeless discharge lamp, manufactured by Fusion UV Systems Inc., under an accumulated light quantity of 4000 mJ/cm² at a wavelength of 365 nm. An initial weight of each cured resin was measured, and then it was immersed in water at 25° C. for 24 hours. Thereafter, the weight of each cured resin was measured. A degree of swelling of each composition was calculated in accordance with [degree of swelling (%)={(weight of the cured resin after immersed−initial weight of the cured resin)/initial weight of the cured resin}×100], and the results of the calculation are shown in Table 2-7. It is clear from the results that the composition of Example 2-1 is hardly affected by cutting water used in processing because the degree of swelling is low after immersed in water at 25° C., as compared with the resin compositions using the hydrophilic (meth)acrylate as in Comparative Examples.

TABLE 2-6

| | Maximum of chips on the back side of ten cut test pieces (μm) Cut test piece No. | | | | | | | | | | | |
|---|---|---|---|---|---|---|---|---|---|---|---|---|
| | 1 | 2 | 3 | 4 | 5 | 6 | 7 | 8 | 9 | 10 | Average | Standard deviation |
| Example 2-25 | 54 | 44 | 45 | 41 | 52 | 56 | 39 | 45 | 47 | 46 | 46.9 | 5.2 |
| Comparative Example 2-7 | 44 | 51 | 70 | 52 | 47 | 42 | 49 | 50 | 59 | 51 | 51.5 | 7.6 |
| Comparative Example 2-8 | 80 | 93 | 75 | 103 | 84 | 92 | 76 | 99 | 109 | 118 | 92.9 | 13.7 |

TABLE 2-7

| | Composition No. | Degree of swelling |
|---|---|---|
| Example 2-26 | Example 2-1 | 0.8 |
| Comparative Example 2-9 | Comparative Example 2-5 | 100 |
| Comparative Example 2-10 | Comparative Example 2-6 | Impossible to measure because of dissolution |

Example 3-1

A composition was prepared by adding 1.5 parts by mass of BDK as the photopolymerization initiator of (D3) and 0.1 part by mass of MDP as the polymerization inhibitor to a total amount of 100 parts consisting of 35 parts by mass of SHIKOH UV-7000B (manufactured by Nippon Synthetic Chemical Industry Co., Ltd., hereinafter abbreviated as UV-7000B") as the urethane(meth)acrylate of (A3), 40 parts by mass of n-acryloyloxyethyl hexahydrophthalimide (TO-1429 manufactured by TOAGOSEI CO., LTD., hereinafter abbreviated as "TO-1429") as the n-(meth)acryloyloxyalkyl hexahydrophthalimide of (B3), 5 parts by mass of w-carboxy-polycaprolactone mono(meth)acrylate (ARONIX M-5300 manufactured by TOAGOSEI CO., LTD., hereinafter abbreviated as "M-5300") as the carboxyl group-containing (meth)acrylate and 20 parts by mass of phenoxy ethyl acrylate (Light Acrylate PO-A manufactured by Kyoeisha Chemical Co., Ltd., hereinafter abbreviated as "PO-A") as the (meth)acrylic acid derivative monomer having the general formula (C3). The measurement of tensile shear bond strength and the removing test were carried out using the compositions prepared. Table 3-1 shows the results of those.

Examples 3-2 to 3-5

Compositions were prepared in the same manner as in Example 3-1 except that raw materials of types as identified in Table 3-1 were used in compositions as identified in Table 3-1. The measurement of tensile shear bond strength and the removing test were carried out in the same manner as in Example 3-1, using the compositions prepared. Table 3-1 shows the results of those.

Materials Used

EBECRYL 2001: water-soluble urethane acrylate (EBECRYL 2001 manufactured by Daicel UCB Co., Ltd.)

M-5700: 2-hydroxy-3-phenoxypropyl acrylate (ARONIX M-5700 manufactured by TOAGOSEI CO., LTD.)

Comparative Examples 3-1 to 3-5

Compositions were prepared in the same manner as in Example 3-1 except that raw materials of types as identified in Table 3-2 were used in compositions as identified in Table 3-1. The measurement of tensile shear bond strength and the removing test were carried out in the same manner as in Example 3-1, using the compositions prepared. Table 3-2 shows the results of those.

TABLE 3-1

| Example No. | 3-1 | 3-2 | 3-3 | 3-4 | 3-5 | 3-6 | 3-7 |
|---|---|---|---|---|---|---|---|
| (A3) component (parts by mass) | | | | | | | |
| UV-7000B | 35 | 20 | 35 | | | | |
| EBECRYL 2001 | | | | 35 | 35 | 50 | 20 |
| (B3) component (parts by mass) | | | | | | | |
| TO-1429 | 40 | 55 | 40 | 40 | 25 | 25 | 55 |
| M-5300 | 5 | 5 | 5 | 5 | 20 | 5 | 5 |
| PO-A | 20 | 20 | | 20 | 20 | 20 | 20 |
| M-5700 | | | 20 | | | | |
| (D3) photopolymerization initiator (parts by mass) | | | | | | | |
| BDK | 1.5 | 1.5 | 1.5 | 1.5 | | 1.5 | 1.5 |
| TPO | | | | | 1.5 | | |
| Polymerization inhibitor (part by mass) | | | | | | | |
| MDP | 0.1 | 0.1 | | 0.1 | 0.1 | 0.1 | 0.1 |
| Adhesive strength (MPa) | 15.9 | 13.3 | 18.1 | 13.4 | 13.8 | 12.1 | 14.2 |
| Period to removal in warm water at 80° C. (min) | 60 | 100 | 150 | 78 | 120 | 87 | 55 |
| Removed state*) | film form | film form | film form | film form | film form | film form | film form |

*)Film form: a cured resin of a composition removed in the form of a film with no adhesive residue, from a surface of glass.

TABLE 3-2

| | Comparative Example No. | | | | |
|---|---|---|---|---|---|
| | 3-1 | 3-2 | 3-3 | 3-4 | 3-5 |
| (A3) component (parts by mass) | | | | | |
| UV-7000B | 25 | 5 | 5 | | |
| (B3) component (parts by mass) | | | | | |
| TO-1429 | 10 | 70 | 5 | | |
| M-5300 | 55 | 5 | 5 | | |
| PO-A | 10 | 20 | 85 | | |
| MTEGMA | | | | | 70 |
| Other components | | | | | |
| Acryloyl morpholine | | | | 100 | 30 |
| (D3) photopolymerization initiator (parts by mass) | | | | | |
| BDK | 1.5 | 1.5 | 1.5 | 1.5 | |
| TPO | | | | | 2.0 |
| Polymerization inhibitor (part by mass) | | | | | |
| MDP | 0.1 | 0.1 | 0.1 | 0.1 | 0.1 |
| Adhesive strength (MPa) | 11.1 | 17.0 | 5.1 | 2.0 | 8.4 |
| Period to removal in warm water at 80° C. (min) | not removed | not removed | not removed | 30 | 60 |
| Removed state** | — | — | — | adhesive residue | adhesive residue |

**)Adhesive residue: a cured resin of a composition remained on a surface of glass, though glass was separated.

Example 3-8

Pyrex glass with 150 mm×150 mm×2 mmt and the blue sheet glass used in Example 3-1 as dummy glass were bonded with the composition in Example 3-1 and the composition was cured in the same manner as in Example 3-1.

Only the Pyrex glass portion of the adhesive test piece was cut in the size of 10 mm square by means of a dicing apparatus. Neither dropping nor loss of the Pyrex glass occurred during cutting, so as to demonstrate satisfactory processability with good chipping resistance. The adhesive test piece with the Pyrex glass portion only being cut was immersed in warm water at 80° C. and the entire adhesive removed in 120 minutes.

INDUSTRIAL APPLICABILITY

The resin composition of the present invention has the photocurable property by virtue of its composition and is cured with visible light or ultraviolet rays, and the cured resin thereof shows a high adhesive strength without being affected by cutting water, and thus provides the effects of inducing little displacement during processing of a member and readily obtaining a member excellent in dimensional accuracy. Furthermore, it is characterized in that it reduces the adhesive strength through contact with warm water to reduce the bonding strength between members or between a member and a jig, thus enabling a member to be readily removed. Therefore, it is industrially useful as an adhesive for temporary fixation of optical lenses, prisms, arrays, silicon wafers, semiconductor packaging parts, and so on.

Since the method for temporarily fixing a member according to the present invention uses the above-mentioned characteristic composition, it is unnecessary to use an organic solvent, which used to be needed in the conventional technologies, and the composition can be recovered in the form of a film from a member, thereby presenting the feature of the excellent workability. By virtue of the characteristics, the present invention is extremely useful from the industrial viewpoint.

The invention claimed is:

1. A composition comprising the following (A3), (B3) and (D3), wherein:
   (A3) is a urethane(meth)acrylate;
   (B3) is a combination of a n-(meth)acryloyloxyalkyl hexahydrophthalimide, a carboxyl group-containing (meth)acrylate; and,
   a (meth)acrylic acid derivative monomer represented by the formula (C3):

$$Z\text{—}O\text{—}(R_2O)_p\text{—}R_1 \qquad \text{Formula (C3):}$$

wherein Z represents a (meth)acryloyl group, $R_1$ represents a phenyl group or a phenyl group having an alkyl group with 1 to 3 carbon atoms, $R_2$ represents —$C_2H_4$—, —$C_3H_6$—, —$CH_2CH(CH_3)$—, —$CH_2CH(OH)CH_2$—, —$C_4H_8$— or —$C_6H_{12}$—, and p represents an integer of from 1 to 10; and (D3) is a photopolymerization initiator.

2. The composition according to claim 1, wherein the urethane(meth)acrylate of (A3) is water-soluble.

3. An adhesive comprising the composition according to claim 1.

4. A method for temporarily fixing a member comprising bonding the member with use of an adhesive according to claim 3, that reduces adhesive strength through contact with water, curing the adhesive to temporarily fix the member, processing the temporarily fixed member, and immersing the processed member in water, thereby removing the cured adhesive.

5. A method for temporarily fixing a member, characterized by comprising bonding the member with use of an adhesive according to claim 3, that reduces adhesive strength through contact with water, curing the adhesive to temporarily fix the member, processing the temporarily fixed member, and immersing the processed member in water to effect swelling thereof, thereby removing the cured adhesive in the form of a film.

6. A method for temporarily fixing a member comprising bonding the member with use of the adhesive as defined in claim 3, curing the adhesive to temporarily fix the member, processing the temporarily fixed member, and immersing the processed temporarily fixed member in water to effect swelling thereof, thereby removing the cured adhesive in the form of a film.

* * * * *